(12) United States Patent
Numanoi et al.

(10) Patent No.: US 7,246,105 B2
(45) Date of Patent: Jul. 17, 2007

(54) STORAGE DEVICE MANAGEMENT METHOD, SYSTEM AND PROGRAM

(75) Inventors: Tadashi Numanoi, Yokohama (JP); Tatsundo Aoshima, Sagamihara (JP); Naoki Shimada, Yokohama (JP); Kei Takeda, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 429 days.

(21) Appl. No.: 10/366,554

(22) Filed: Feb. 14, 2003

(65) Prior Publication Data

US 2003/0220899 A1 Nov. 27, 2003

(30) Foreign Application Priority Data

May 23, 2002 (JP) .............................. 2002-148810

(51) Int. Cl.
*G06F 17/30* (2006.01)
(52) U.S. Cl. .......................... 707/1; 711/154; 709/223
(58) Field of Classification Search .................... 707/1, 707/103, 8, 204; 709/200, 223, 213; 711/100; 702/179
See application file for complete search history.

(56) References Cited

U.S. PATENT DOCUMENTS

| | | | |
|---|---|---|---|
| 5,379,423 A | 1/1995 | Mutoh et al. ................ 707/204 |
| 5,398,337 A * | 3/1995 | Ito ................................. 707/8 |
| 5,537,585 A | 7/1996 | Blickenstaff et al. ........ 707/205 |
| 5,619,690 A | 4/1997 | Matsumani et al. | |
| 5,941,972 A | 8/1999 | Hoese et al. ................. 710/315 |
| 5,956,750 A | 9/1999 | Yamamoto et al. | |
| 5,991,753 A | 11/1999 | Wilde et al. | |
| 6,041,381 A | 3/2000 | Hoese ......................... 710/315 |
| 6,065,087 A | 5/2000 | Keaveny et al. ............. 710/315 |

(Continued)

FOREIGN PATENT DOCUMENTS

JP 3-223941 10/1991

(Continued)

OTHER PUBLICATIONS

Hewlett-Packard, "HP OpenView PolicyXpert user's Guide", Mar. 2001, pp. 17-82.

(Continued)

*Primary Examiner*—Don Wong
*Assistant Examiner*—Sheree N Brown
(74) *Attorney, Agent, or Firm*—Mattingly, Stanger, Malur & Brundidge, P.C.

(57) ABSTRACT

Use situations of storage devices utilizing a storage area network (SAN) are predicted and the devices are automatically managed on the basis of the predicted results. To manage the devices utilizing the SAN, there is established the policy prescribing actions each executed when some object to be judged satisfies some condition with regard to storage devices. Information concerning use situations of the devices is collected and a value of an object to be judged of the policy is calculated based on collected information to judge whether the value of the object to be judged satisfies a condition of the policy. When the condition is satisfied, the action of the policy is executed. The objects to be judged of the policy may be actual result values in the past, current values or prediction values in the future relative to use capacity of storages, the number of I/O operations of disk or fragmentation.

54 Claims, 8 Drawing Sheets

U.S. PATENT DOCUMENTS

| | | | |
|---|---|---|---|
| 6,098,129 A | 8/2000 | Fukuzawa et al. | |
| 6,209,023 B1 | 3/2001 | Dimitroff et al. | 709/211 |
| 6,275,898 B1 | 8/2001 | DeKoning | |
| 6,327,614 B1 | 12/2001 | Asano et al. | |
| 6,446,141 B1 | 9/2002 | Nolan et al. | 710/8 |
| 6,510,456 B1 * | 1/2003 | Ikegaya et al. | 703/213 |
| 6,598,174 B1 | 7/2003 | Parks et al. | |
| 6,640,278 B1 | 10/2003 | Nolan et al. | 711/6 |
| 6,647,474 B2 | 11/2003 | Vishlitzky et al. | |
| 6,654,830 B1 | 11/2003 | Taylor et al. | 710/74 |
| 6,745,207 B2 | 6/2004 | Reuter et al. | 707/200 |
| 6,751,702 B1 | 6/2004 | Hsieh et al. | 711/112 |
| 6,810,462 B2 | 10/2004 | Matsunami et al. | |
| 6,922,761 B2 | 7/2005 | O'Connell et al. | 711/162 |
| 6,938,039 B1 | 8/2005 | Bober et al. | 707/8 |
| 6,947,940 B2 | 9/2005 | Anderson et al. | |
| 6,950,920 B1 | 9/2005 | Mizuno et al. | |
| 6,973,455 B1 | 12/2005 | Vahalia et al. | |
| 2001/0054133 A1 | 12/2001 | Murotani et al. | |
| 2002/0059539 A1 | 5/2002 | Anderson | |
| 2002/0062387 A1 | 5/2002 | Yatziv | 709/236 |
| 2002/0161855 A1 | 10/2002 | Manczak et al. | 709/219 |
| 2003/0046270 A1 | 3/2003 | Leung et al. | |
| 2003/0061440 A1 | 3/2003 | Elliott | 711/112 |
| 2003/0065873 A1 * | 4/2003 | Collins et al. | 711/100 |
| 2003/0074523 A1 | 4/2003 | Johnson | 711/203 |
| 2003/0112538 A1 | 6/2003 | Smith | 360/31 |
| 2003/0139900 A1 * | 7/2003 | Robison | 702/179 |
| 2003/0182288 A1 | 9/2003 | O'Connell et al. | 707/10 |
| 2003/0182525 A1 | 9/2003 | O'Connell et al. | 711/162 |
| 2004/0044854 A1 | 3/2004 | Gibble et al. | |
| 2004/0068561 A1 | 4/2004 | Yamamoto et al. | 709/224 |
| 2004/0083202 A1 | 4/2004 | Mu et al. | |
| 2004/0098394 A1 | 5/2004 | Merritt et al. | |
| 2004/0107315 A1 | 6/2004 | Watanabe et al. | |
| 2004/0143563 A1 | 7/2004 | Saake et al. | |
| 2004/0143648 A1 | 7/2004 | Koning et al. | 709/219 |
| 2004/0162940 A1 | 8/2004 | Yagisawa et al. | |
| 2004/0199515 A1 | 10/2004 | Penny et al. | |
| 2004/0210724 A1 | 10/2004 | Koning et al. | 711/153 |
| 2004/0260862 A1 | 12/2004 | Anderson | |
| 2005/0097126 A1 | 5/2005 | Cabrera et al. | 707/102 |
| 2005/0120189 A1 | 6/2005 | Black | |
| 2005/0149528 A1 | 7/2005 | Anderson et al. | 707/9 |
| 2005/0149671 A1 | 7/2005 | Suzuki et al. | |
| 2005/0172097 A1 | 8/2005 | Voigt et al. | |

FOREIGN PATENT DOCUMENTS

| | | |
|---|---|---|
| JP | H5-307532 | 11/1993 |
| JP | H7-69927 | 7/1995 |
| JP | 8-137725 | 5/1996 |
| JP | 09-259037 | 10/1997 |
| JP | 09-274544 | 10/1997 |
| JP | 09-297699 | 11/1997 |
| JP | 10-301720 | 11/1998 |
| JP | 2002-229740 | 8/2002 |

OTHER PUBLICATIONS

W. Quinn, Inc., "Guidelines for Implementing a Network Storage Resource Management Policy", 2001, pp. 1-20.

Tivoli, "Storage Management Solutions for the Information Grid", 2000, pp. 47-52.

Veritas, "Veritas SANPoint Control 2.0 Managing Your SAN with SANPoint Control Solaris and Windows NT/2000", pp. 139-184.

TrelliSoft, "The Storage Resource Management Challenge: Taming Explosive Data Growth in a 24x7 World", 2001, pp. 2-12.

NTP Software, "NTP Software Quota & File Sentinel Quick Start and Evaluation Guide", 2002, pp. 12-18.

"Infrastructure Briefs", Network World, May 26, 2003, p. 19.

H. Biggar, "Disk-Based Backup Options Multiply", INFOSTOR, vol. 6, No. 12, Dec. 2002, pp. 1, 14, 16.

"The IFT-6200 RAID Enclosure with Fibre-to-IDE Interface: The Peace of Mind of MAID, Coupled with the Cost Effectiveness of IDE", Business Wire, Jul. 18, 2001, p. 628.

Infortrend Web page Printed on Sep. 19, 2005 from web address: http://www.infortrend.com/main/2_product/sata.s/asp.

H. Schrimpf, "Migration of Processes, Files and Virtual Devices in the MDX Operating System", ACM SIGOPS Operating Systems Review, vol. 29, Issue 2, Apr. 1995, pp. 70-81.

B. Gavish et al, "Dynamic File Migration in Distributed Computer Systems", Communications of the ACM, vol. 33, No. 2, Feb. 1990, pp. 177-189.

DiskXtender 5.4—Technical Product Overview, Product Information obtained from http://www.legato.com, dated 2003.

"External Doc Archive: Product Documentation", printout of webpage located at http://web1.legato.com/cgi-bin/catalog?sf=Release&level=9-13.

"Data Manager System Guide" from website http://web1.legato.com/cgi-bin/catalog?sf=Releases&level=9-13, 481 pages, published Jan. 2003.

J. Moran et al, "The Restore-o-Mounter: The File Motel Revisited", Proceedings of the Usenix Summer 1993 Technical Conference, Jun. 1993.

B. Chronister, "OPEN/stor 2.0", Windows IT Pro, Dec. 1997, obtained online at http://www.windowsitpro.com/Articles/Print,cfm?ArticleID=211.

"VERITAS NetBackup Storage Migrator for UNIX v4.5", Veritas White Paper, 2002.

M. Hope, "Users Tier Storage for ILM", INFOSTOR, Sep. 2005.

* cited by examiner

FIG.6

EXAMPLE OF POLICY (1) WHEN THE USE CAPACITY OF DISK FOR SERVER 1 EXCEEDS 80%,
TEMPORARY FILE IS DELETED.

(2) WHEN THE PREDICTION VALUE OF THE USE CAPACITY OF DISK
AFTER ONE MONTH FOR THE SERVER 1 EXCEEDS 100%,
DATA IN THE DISK DEVICE IS MOVE TO ANOTHER DISK DEVICE.

(3) WHEN THE PREDICTION VALUE OF THE USE CAPACITY OF DISK
AFTER TWO MONTH FOR THE SERVER 1 EXCEEDS 100%,
THE TEMPORARY FILE IN THE DISK DEVICE IS DELETED AND WHEN THE PREDICTION
VALUE OF THE USE CAPACITY OF DISK AFTER TWO MONTH EXCEEDS 100% EVEN
AFTER THE DELETION, DATA IN THE DISK DEVICE IS COMPRESSED.

(4) WHEN THE PREDICTION VALUE OF THE USE CAPACITY OF DISK
AFTER ONE MONTH FOR THE DISK DEVICE 1 EXCEEDS 80%
AND WHEN THE PREDICTION VALUE OF THE USE CAPACITY OF DISK
AFTER ONE MONTH FOR THE DISK DEVICE 2 EXCEEDS 80%,
THE MESSAGE THAT A DISK DEVICE SHOULD BE ADDED IS DISPLAYED.

(5) WHEN THE INCREASE RATE AT THE PRESENT TIME OF THE NUMBER OF I/O OPERATIONS
(DURING A PREDETERMINED PERIOD) FOR THE DISK DEVICE 1 IS EQUAL TO OR LARGER
THAN A PREDETERMINED VALUE RP, THE FILE HAVING THE USE FREQUENCY
WITHIN A PREDETERMINED PERIOD IN THE PAST WHICH IS EQUAL TO OR LARGER
THAN XX TIMES IS MOVED TO ANOTHER DISK DEVICE.

(6) WHEN THE PREDICTION VALUE OF THE FRAGMENTATION AFTER ONE MONTH
FOR THE DISK DEVICE 1 IS EQUAL TO OR LARGER THAN 50%, OPTIMIZATION IS MADE.

⋮

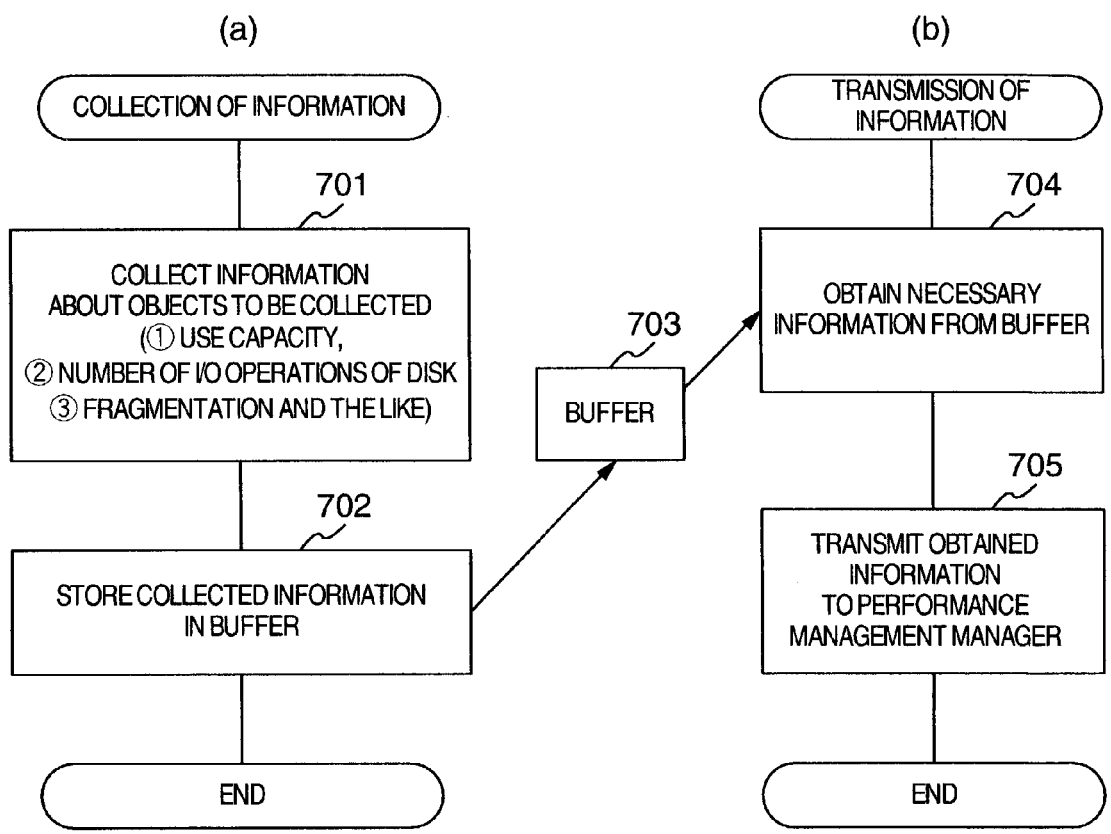

PROCESSING OF PERFORMANCE MANAGEMENT MANAGER

PROCESSING OF MANAGEMENT SERVER

FIG.10A

EXAMPLE OF STATE TRANSITION DIAGRAM USED IN JUDGMENT OF CONDITIONS

| STATE / EVENT | S1 | S2 | S3 | S4 |
|---|---|---|---|---|
| I1 | →S2 | | | |
| I2 | | →Z1 | | |
| ⋮ | ⋮ | ⋮ | ⋮ | ⋮ |

FIG.10B

| ACTION | DESTINATION OF TRANSMISSION OF COMMAND | COMMAND | PARAMETER | EMERGENCY DEGREE |
|---|---|---|---|---|
| Z1 | DATA PROTECTION AND INTEGRATION CONTROL UNIT | copy | DESTINATION OF COPY = YY | DURING TODAY |
| ⋮ | ⋮ | ⋮ | ⋮ | ⋮ |

STORAGE DEVICE MANAGEMENT METHOD, SYSTEM AND PROGRAM

BACKGROUND OF THE INVENTION

The present invention relates to management technique of storage devices in which a use situations of the storage devices utilizing a storage area network (SAN) are predicted to manage the storage devices on the basis of the predicted result.

Heretofore, there is known the storage area network (SAN) that is a system for connecting storage devices through a network in contrast with a system for connecting computers through a network. In the SAN, the storage devices are usually connected through a fiber channel switch. Further, the storage devices can be connected to the storage devices installed in a remote place through a channel extender. The SAN is characterized in that transfer between the storage devices is made stably at a high speed.

Usually, a predetermined management system is provided for such storage devices and the management system can be used to make setting and management of various kinds to the storage devices. For example, it can be established that various use situations of the storage devices are displayed, which disk is used from which computer, what is the capacity thereof and so on.

On the other hand, JP-A-8-137725 discloses the technique of predicting the performance of a computer system upon change of an operation amount and modification of the hardware configuration.

SUMMARY OF THE INVENTION

The conventional management system of the storage devices can display information about various use situations in the devices. Accordingly, a user can be informed that the use capacity of a certain computer exceed 90% (the rate of the use capacity to the maximum capacity assigned to the computer) to thereby make treatment such as increase of the assignment amount or increase of a disk device.

In the conventional management system, however, since the displayed use situations are information representing the situations at the present time, it is impossible to understand how the situations are changed in the future. For example, even when the use capacity exceeds 90%, there is a case where any problem does not arise even if it is left as it is for a while when an increase rate is small, although it is necessary to make treatment such as increase of an assignment capacity promptly when the increase rate is large. The conventional management system cannot make management responsive to such change in the future.

Further, there is known the technique of predicting the performance as described in JP-A-8-137725, while even if the technique is applied to management of the storage devices, a prediction value is merely obtained and a manager is required to judge how treatment is made in response to the prediction value.

It is an object of the present invention to make it possible to analyze condition information of storage devices and manage the storage devices on the basis of the analyzed result.

In order to achieve the above object, according to the present invention, in order to manage the storage devices utilizing a storage area network (SAN), there is established policy that prescribes actions each executed when some object to be judged satisfies some condition with regard to storage devices. Information concerning use situations of the storage devices is collected and a value of an object to be judged of the policy is calculated on the basis of the collected information to judge whether the value of the object to be judged satisfies a condition of the policy or not. In this judgment, when the condition of the policy is satisfied, the action of the policy is executed. The objects to be judged of the policy include, for example, use capacity of storage, the number of I/O operations of disk or fragmentation. Further, the objects to be judged include actual result values in the past, current values or prediction values in the future relative thereto. Execution of the action of the policy is made by transmitting a command of the action to an integration control unit which integrates operations to each logical layer of the SAN to be executed.

BRIEF DESCRIPTION OF THE DRAWINGS

FIG. 3 is a block diagram schematically illustrating a data protection and integration control unit which an action execution unit instructs to execute action and the like;

FIG. 6 shows an example of the policy established;

FIG. 7 is a flow chart showing processing example of an agent;

FIGS. 10A and 10B show an example of a state transition diagram used for judgment of condition.

DESCRIPTION OF THE EMBODIMENTS

An embodiment of the present invention is now described with reference to the accompanying drawings.

Figure 1:
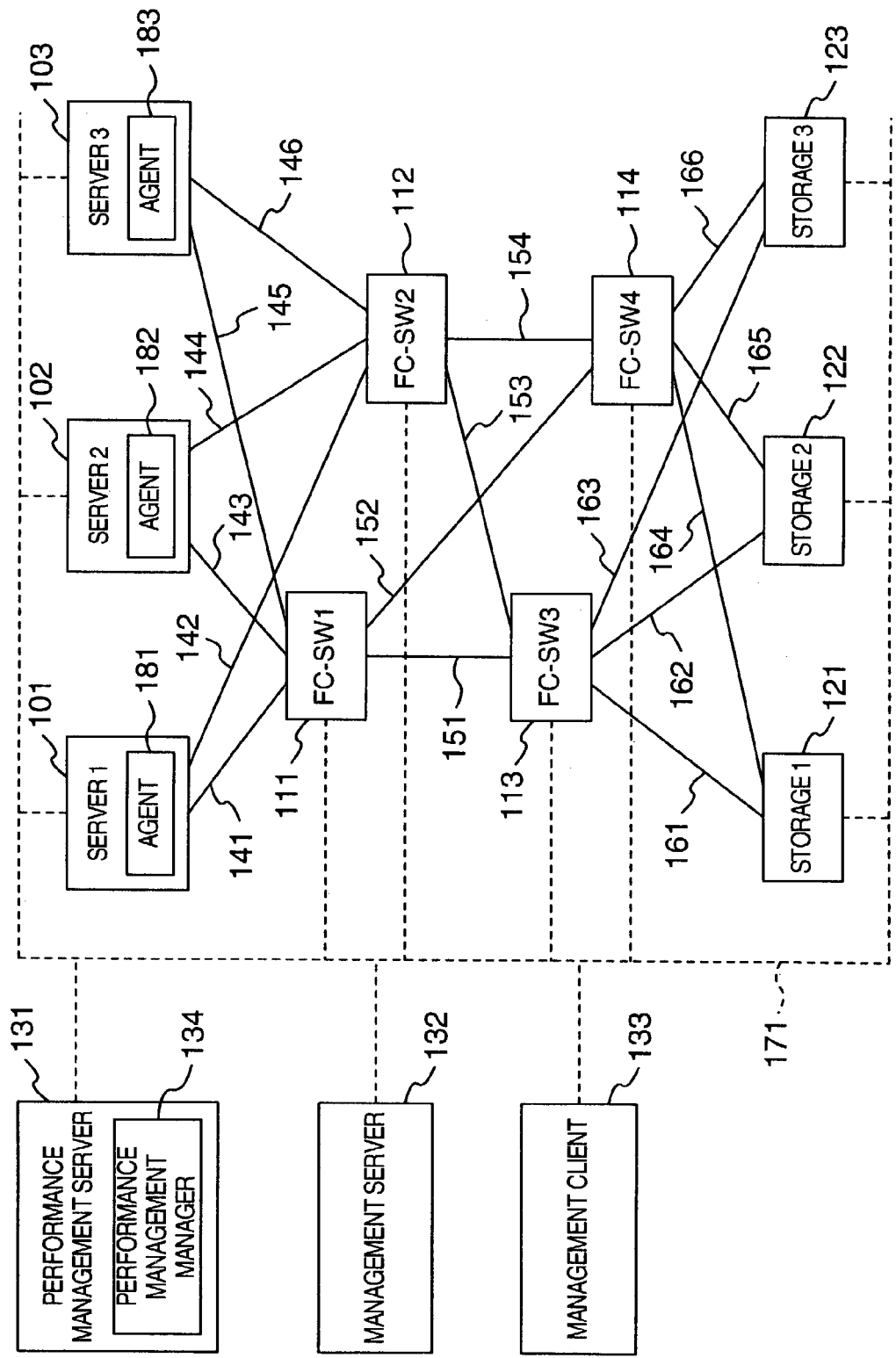
FIG. 1 is a schematic diagram illustrating an example of a system to which storage device management technique of the present invention is applied.

FIG. 1 is a schematic diagram illustrating an example of a storage network system to which storage device management technique according to the present invention is applied. The system includes host computers (hereinafter merely referred to as servers) 101, 102 and 103 constituting servers, fiber channel switches (hereinafter referred to as switches) 111, 112, 113 and 114, disk devices (storages) 121, 122 and 123, a performance management server 131, a management server 132 and a management client 133. The switches 111, 112, 113 and 114 and the disk devices 121, 122 and 123 constitute a storage area network (SAN). The performance management server 131 is a computer which executes programs including the function of a performance manager 134.

The server 101, 102 and 103 are connected to the switches 111 and 112 through lines 141 to 146 of SCSI. The switches 111 and 112 are connected to the switches 113 and 114 through fiber channels 151 to 154 and the switches 113 and 114 are connected to the disk devices 121, 122 and 123 through fiber channels 161 to 166. Further, these apparatuses are connected to a network shown by broken line 171. The protocol of the network 171 is TCP/IP. The TCP/IP network 171 is provided so as to control configuration and the like of the devices, detect trouble of the devices and so on. Commands for making control by Telnet are defined for the switches so as to make it possible to control the switches by the commands. In the embodiment, the TCP/IP network 171 is used to obtain the configuration information and the use situations of the storage network.

Agents 181, 182 and 182 which are programs for collecting information concerning the use situations of the storages are operated in the servers 101, 102 and 103. The agents 181, 182 and 183 collect information concerning, for example, use capacities of the storages used by the servers, the number of I/O operations of disk, fragmentation in each used area and the like. The collected information is transmitted to the performance manager 134 when a request is issued from the performance manager 134 by polling.

The performance manager 134 is operated in the performance management server 131. The performance manager 134 collects information of various kinds concerning the use situations of the storages in each server by polling the agents 181, 182 and 183 operating in the servers using the storages. Further, the performance manager analyzes the collected information. This analyzation contains transition or change in the past, current actual results and prediction of the future. For example, as prediction values of the use capacity of a certain disk, prediction values of the use capacity predicted after one week and after one month are calculated. What information is collected and what analyzation is made can be designated by the user's policy. This will be described in detail later.

The management server 132 manages the storage devices of the system. The management client 133 accesses to the management server 132 and instructs the management server to display the configuration information of the storage devices. The management client 133 displays a picture showing the configuration information of the storage network sent from the management server 132 in response to the instruction. Further, the management client 133 can access to the management server 132 to perform control of various kinds to the storage devices. For example, a maximum value of the use capacity for a certain server is set and changed. Moreover, the management client 133 can be connected to the management server 132 to select the policy. The policy is to relates to management of the storage devices. Particularly, when the prediction values of various kinds concerning the storage devices satisfy a predetermined condition, the system can establish the policy prescribing how the system cope therewith.

For example, the system can establish the policy that "if the prediction value of the use capacity of the disk device after one month for the server 1 exceeds 100%, data in the disk device is moved to another disk device". This is the policy instructing that the prediction value of the use capacity of the disk device after one month for the disk device used by the server 1 is calculated and if it exceeds 100%, data in the disk device is automatically moved to another disk device. Such policy can be established to thereby manage the storage device on the basis of the prediction value in the future. Similarly, management can be also made on the basis of the actual results at the present time and in the past. A definite example of the policy will be described later.

Figure 2:
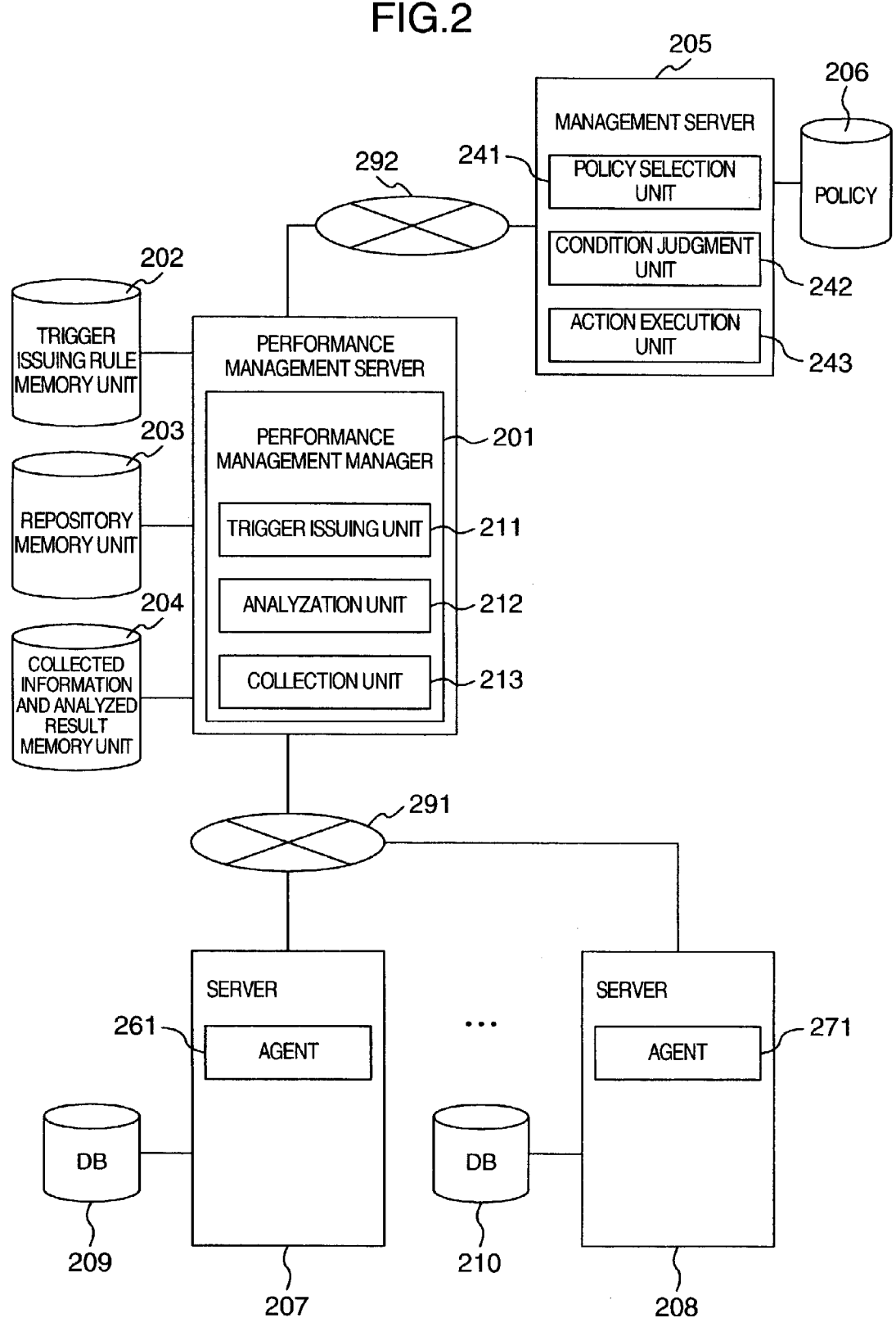
FIG. 2 is a block diagram schematically illustrating a characteristic portion in the system of the embodiment in detail.

FIG. 2 is a block diagram schematically illustrating a characteristic portion in the system of the embodiment shown in FIG. 1 in detail.

Servers 207 and 208 are computers corresponding to the servers 101, 102, 103 and the like of FIG. 1. Agents 261 and 271 are operated in the servers 207 and 208, respectively.

The agents 261 and 271 correspond to the agents 181, 182, 183 and the like of FIG. 1. The servers 207 and 208 are connected to databases (DB) 209 and 210, respectively. The DBs 209 and 210 are formed in memory areas assigned to the servers by utilizing the SAN of FIG. 1.

A performance manager 201 corresponds to the performance manager 134 operated in the performance management server 131 of FIG. 1. A management server 205 corresponds to the management server 132 of FIG. 1. The performance manager 210, the servers 207 and 208 are connected to a network 291. The performance manager 201 and the management server 205 are connected to a network 292. The networks 291 and 292 are TCP/IP networks. The networks 291 and 292 correspond to the network 171 of FIG. 1. In FIG. 2, the management client corresponding to the management client 133 of FIG. 1 is not shown, although the management client not shown is connected to the performance manager 201 and the management server 205 to thereby make it possible to display information of various kinds and give instructions.

The performance manager 201 is connected to a trigger issuing rule memory unit 202, a repository memory unit 203 and a collected information and analyzed result memory unit 204. The collected information and analyzed result memory unit 204 stores information collected by means of the agents 261 and 271 and analyzed results obtained by analyzing the collected information. The trigger issuing rule memory unit 202 stores a trigger issuing rule. The trigger issuing rule is a rule representing a condition for issuing a trigger (condition for starting the policy) to the management server 205. When the collected information and the analyzed result satisfy the trigger issuing rule, the trigger is issued to the management server 205. The repository memory unit 203 stores repository. The repository includes configuration information of the network, configuration information of the storages, scenario definition information, schedule information, policy definition information, history information and the like.

The management server 205 is provided with a policy memory unit 206. The policy memory unit 206 stores the policy selected by the user. The management server 205 includes a policy selection unit 241, a condition judgment unit 242 and an action execution unit 243. Further, the performance manager 201 includes a trigger issuing unit 211, an analyzation unit 212 and a collection unit 213.

The policy selection unit 241 of the management server 205 receives policy selection operation by the user and stores the selected policy in the policy memory unit 206. The policy selection operation can be made from the management client (133 of FIG. 1) not shown. Further, the policy selection unit 241 sends the trigger issuing rule corresponding to the selected policy to the performance manager 201 and stores it in the trigger issuing rule memory unit 202.

The collection unit 213 of the performance manager 201 polls the agents 261 and 271 operating in the servers to thereby collect information of various kinds in the servers. The collected results are stored in the collected information and analyzed result memory unit 204. The analyzation unit 212 analyzes the collected information and stores the analyzed result in the collected information and analyzed result memory unit 204. The trigger issuing unit 211 judges whether the analyzed result is coincident with the trigger issuing rule 202 or not. When the trigger issuing rule is satisfied, a trigger signal is issued to be transmitted to the management server 205.

The management server 205 receives the issued trigger and the condition judgment unit 242 judges the condition containing the trigger to judge whether action is executed or not. When the action is to be executed, the action execution unit 243 executes the predetermined action.

In execution of the action, an instruction that causes the computer, the storage device, the program or the like to execute processing may be transmitted or processing in execution may be interrupted or other processing may be executed.

The data of the trigger signal transmitted from the performance manager to the management server may contain information collected from the computer in which the program for managing the storage device is executed, information of the analyzed results of information of various kinds, information inherent in the performance manager and other information. For example, when a plurality of performance managers are operated and the management server receives information from the plurality of performance managers, an identification is assigned to each of the performance manager and the performance managers attach their own identification to data of the analyzed result to be transmitted to the management server to transmit the data to the management server so that the management server can identify the performance manager transmitting the data to thereby make processing.

In FIG. 2, the performance management server and the management server are shown as separate computers connected through the network, although the function of the performance manager and the function of the program operating in the management server may be implemented by the same computer. Further, in FIG. 2, the management server 205 is connected to the network 292, although the server 205 may be connected to the network 291.

In the above configuration, the policy for managing the storage devices can be executed on the basis of transition in the past, current actual results and prediction of the future.

Figure 3:
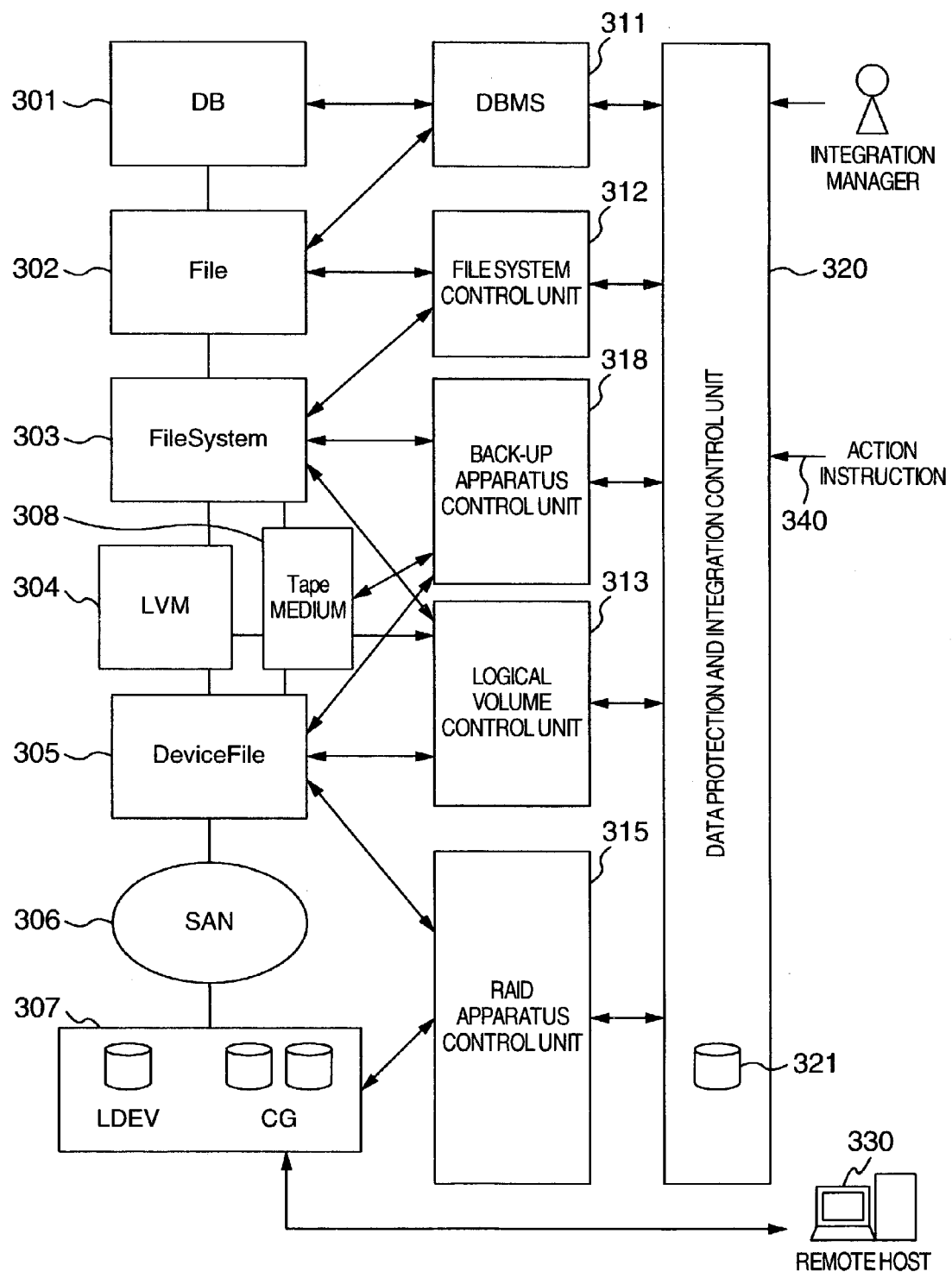

FIG. 3 is a diagram schematically illustrating a data protection and integration control unit which the action execution unit 243 instructs to execute the action and management tools which execute the actions instructed actually in each logical layer of the system by the data protection and integration control unit.

In FIG. 3, numerals 301 to 307 shown in the left represent logical layers of the storage configuration of the system shown in FIG. 1. DB 301 represents a layer of logical databases. In this layer, the database is composed of some tables and each of the table is specified by a table name. File 302 represents a layer of logical files. In this layer, the tables constituting the database are composed of the logical files and each of the files is specified by a file name. File System 303 represents a layer of logical file systems. In this layer, the file system in which the logical files are registered is specified. LVM (logical volume) 304 is a layer of logical disk volumes. In this layer, each of the logical volumes is specified by a logical volume name. Device File 305 is a layer of device files which are interfaces of individual disks in an actual RAID constituting the logical volume. In this layer, the individual disk constituting the logical volume is specified by a logical device name. SAN 306 is a layer of storage area networks constituted by the RAID. LDEV 307 is a layer of physical disks. In this layer, a disk of the logical device name is specified by a serial number for identifying a housing of the RAID and a disk number for identifying each disk in the housing.

Management tools 311 to 315 in the layers are provided. DBMS (DB management system) 311 is a tool for managing the databases and the files in the layers of DB 301 and File 302. A file system control unit 312 is a tool for managing the files and the file systems in the layers of File 302 and File System 303. A logical volume control unit 313 is a tool for managing the logical volumes in the layer of LVM 304 mainly and further makes even management of the layers of File System 303 and Device File 305 in relation to the logical volumes. RAID apparatus control unit 315 is a tool for managing the RAID in the layer of Device File 305 to LDEV 307.

The data protection and integration control unit 320 manages the correspondence relation of objects representing how objects correspond to in the layers from DB 301 of the higher rank to the LDEV 307 of the lower rank. Further, the data protection and integration control unit 320 provides the function for making it possible to execute operation such as backup and restore by one command. Consequently, the integration manager is merely required to give the data protection and integration control unit 320 an instruction by means of a simple command such as, for example, "back the table of DB up" even if the manager does not have any knowledge about all the layers. This reason is that the data protection and integration control unit 320 can follow the layers from the table name to the lower layer to easily understand the physical disk in which the table is stored and the group of the disk to be backed up is previously defined. Numeral 321 represents repository (management DB) corresponding to the repository memory unit 203 of FIG. 2. The repository 321 includes link information representing the correspondence relation from the higher-rank layer to the lower-rank layer. Numeral 330 represents a remote host sharing the LDEV 377. Numeral 308 represents a layer of a tape medium used when back-up is made to a tape device. A back-up apparatus control unit 318 is a management tool provided so as to easily make back-up processing particularly.

In the embodiment, the action execution unit 243 of FIG. 2 issues an action instruction 340 to the data protection and integration control unit 320 which integrates and controls the layers as described above to thereby execute action of various kinds. The data protection and integration control unit 320 is provided in the management server 205. When the data protection and integration control unit 320 gives instructions to the control units 311, 312, 313, 315 and 318 of the layers, the instructions are sent via the TCP/IP network 171 of FIG. 1.

Figure 4:
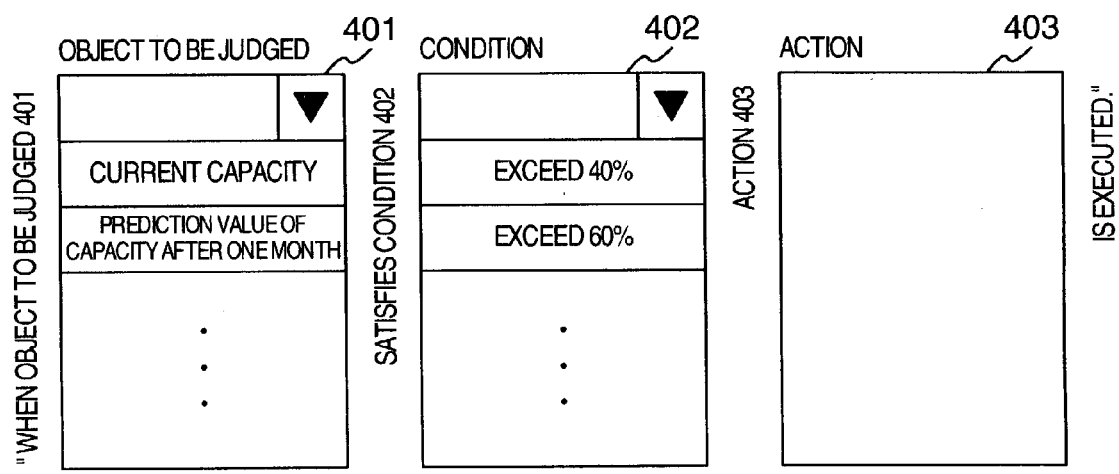
FIG. 4 shows an example of a user interface upon establishment of policy.

FIG. 4 shows an example of a user interface upon establishment of the policy. The policy is basically composed of objects to be judged, conditions and action.

The objects to be judged are measured values of various kinds concerning the storages and contains transition in the past, current actual results and prediction of the future. As the objects to be judged, the capacity, the number of I/O operations of disk and fragmentation can be designated. The capacity contains, for example, "the current use capacity (the use capacity of the memory medium at the present time) of the server 1", "the prediction value of the use capacity after one month of the server 1" and the like. Further, a value utilizing a differential value of the use capacity such as an increase rate of the use capacity calculated from transition of the use capacity in the past is allowed to be contained in the objects to be judged. With regard to the number of I/O operations of disk, "the number of I/O operations of disk during a predetermined period", "an increase rate at the present time of the number of I/O operations of disk", "a cumulative value of the numbers of I/O operations of disk during a predetermined period", "a prediction value of the number of I/O operation of disk of tomorrow" and the like are allowed to be contained in the objects to be judged. With regard to the fragmentation, "fragmentation at the present time", "a prediction value of fragmentation after one month" and the like are allowed to be contained in the objects to be judged. Numeral 401 represents an example of a list box for establishing the objects to be judged. Although not shown in FIG. 4, a server or a disk device of which a current capacity and the like is calculated can be designated.

The conditions are established for the objects to be judged. For example, the condition that the object to be judged "exceeds 40%", "exceeds 60%" and the like can be designated. Numeral 402 represents the list box for establishing the conditions for the objects to be judged.

The action is executed when the object to be judged satisfies the condition. Numeral 403 represents an action description area in which the action is described and a command of the action desired to be executed is described in this area. Describable commands are commands for the data protection and integration control unit 320 explained with reference to FIG. 3. The data protection and integration control unit 320 integrates the tools of the layers to perform processing and accordingly an instruction of the action can be given by describing a simple command. The actions are, for example, as follows:

to copy a predetermined file to another disk device;
to delete a temporary file;
to compress a predetermined file;
to back up to a tape or the like;
to issue a message for adding a disk;
to inform by means of an electronic mail or a picture display that the condition for the object to be judged is satisfied;
to move a file having a high use frequency to another file;
to disperse loads by duplication of paths; and
to move files so that files roughly resembling or equal to each other in the capacity thereof are stored in the same disk.

The list box is used to make selection by clicking a downward triangular mark at the right, although the method of establishing the policy is not limited thereto.

Figure 5:
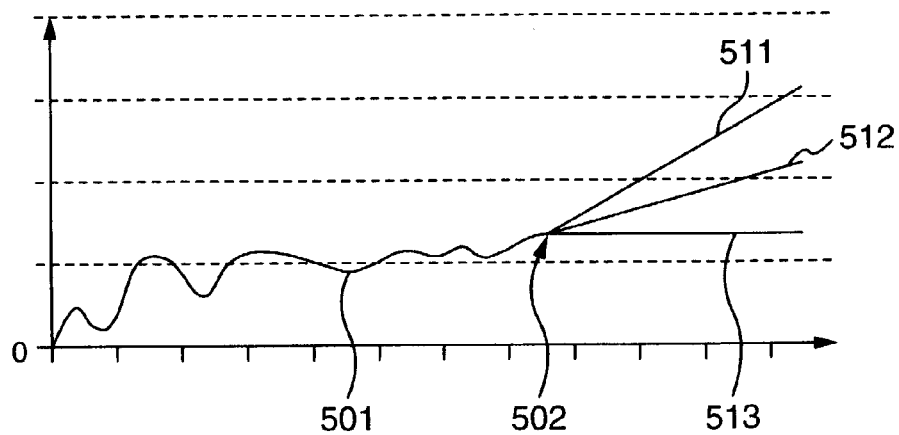
FIG. 5 is a graph showing an example of change of objects to be judged and prediction values.

FIG. 5 shows an example of a graph of change of the object to be judged and prediction values. The abscissa axis represents time and the ordinate axis represent the use capacity. Numeral 501 represents a curve showing the object to be judged such as, for example, the use capacity of a certain disk. The point indicated by numeral 502 represents at this moment in time. A graph 512 of the normal prediction value, a graph 513 of the lower-limit prediction value and a graph 511 of the upper-limit prediction value are shown starting from this moment in time 502. In this way, when the "prediction value" is designated, the normal prediction value, the upper-limit prediction value or the lower-limit prediction value can be designated. Such graphs of the prediction values can be known by any prediction method known heretofore.

FIG. 6 shows an example the policy established. In the policy defining that (1) "when the use capacity of disk for the server 1 exceeds 80%, the temporary file is deleted", the object to be judged is "the use capacity of disk at this moment in time for the server 1", the condition is "to exceed 80%" and the action is "to delete the temporary file". In the policy defining that (2) "when the prediction value of the use capacity of disk after one month for the server 1 exceeds 100%, data stored in the disk device is move to another disk device", the object to be judged is "the prediction value of the use capacity of disk for the server 1", the condition is "to exceed 100%" and the action is "to move data stored in the disk device used by the server 1 to another disk device". In this case, data (file) to be moved may be designated previously.

In the policy defining that (3) "when the prediction value of the use capacity of disk after two month for the server 1 exceeds 100%, the temporary file in the disk device is deleted and when the prediction value of the use capacity of disk after two month exceeds 100% even after the deletion, data stored in the disk device is compressed", the object to be judged is "the prediction value of the use capacity of disk after two month for the server 1", the condition is "to exceed 100%" and the action is "to delete the temporary file in the disk device used by the server 1 and when the prediction value of the use capacity of disk after two month even after the deletion, data in the disk device is deleted". In this case, the action is to be described using the script. The data protection and integration control unit 320 has the function of interpreting the script and executing it.

In the policy defining that (4) "when the prediction value of the use capacity of disk after one month for the disk device 1 exceeds 80% and when the prediction value of the use capacity of disk after one month for the disk device 2 exceeds 80%, the message that a disk device should be added is displayed", the object to be judged is "the prediction value of the use capacity of disk after one month for the disk device 1" and "the prediction value of the use capacity of disk after one month for the disk device 2", the condition is "to exceed 80%" for both the objects and the action is "the message that a disk device should be added is displayed". This is an example that sets of the objects to be judged and the conditions are combined by AND. In this case, a user interface for designating the combination of such conditions is required.

In the policy defining that (5) "when the increase rate at this moment in time of the number of I/O operations (for a predetermined period) for the disk device 1 is equal to or larger than a predetermined value RP, the file having the use frequency within a predetermined period in the past which is equal to or larger than XX times is moved to another disk device", the object to be judged is "the increase rate at this moment in time of the number of I/O operations (for a predetermined period) for the disk device 1", the condition is "to be equal to or larger than a predetermined value RP" and the action is "the file having the use frequency within a predetermined period in the past which is equal to or larger than XX times is moved to another disk device".

In the policy defining that (6) "when the prediction value of the fragmentation after one month for the disk device 1 is equal to or larger than 50%, optimization is made", the object to be judged is "the prediction value of the fragmentation after one month for the disk device 1", the condition is "to be equal to or larger than 50%" and the action is "the disk device 1 is optimized".

FIG. 7 shows an example of processing of the agents 261 and 271. FIG. 7(a) shows a procedure of information collection processing. In step 701, information about the objects to be collected is collected. For example, information about ① the use capacity, ② the number of I/O operations of disk, ③ fragmentation and the like is collected. In next step 702, the collected information is stored in a buffer 703. The collection processing of information is executed repeatedly at regular intervals.

FIG. 7(b) shows the procedure of information transmission processing. This information transmission processing is executed when polling is performed from the performance manager. First, in step 704, necessary information is obtained from the buffer 703. In step 705, the obtained information is transmitted to the performance manager 201. The information obtained to be transmitted is to be designated by polling.

Figure 8:
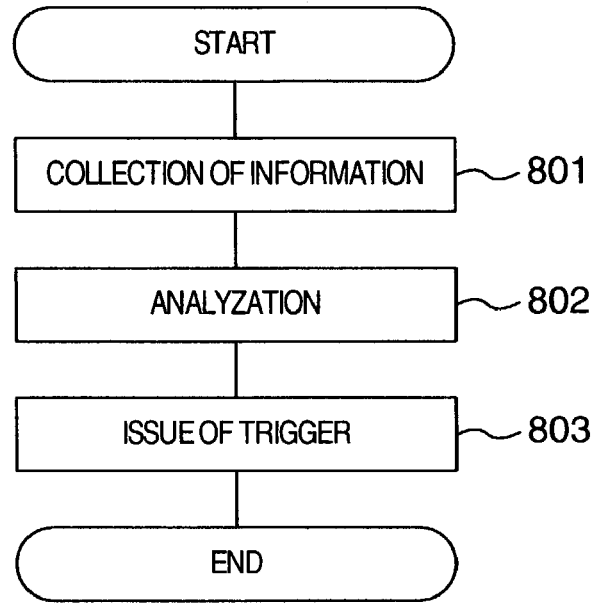
FIG. 8 is a flow chart showing processing example of a performance manager.

FIG. 8 shows an example of processing of the performance manager 201. The performance manager 201 collects information in step 801. In this processing, the performance manager 201 makes polling to each of the agents and collects information of various kinds transmitted from each of the agents in the processing of FIG. 7(b). The collected information is stored in the collected information and analyzed result memory unit 204 shown in FIG. 2. In step 802, the collected information is analyzed. Prediction values for various objects to be judged are also calculated if necessary. Next, in step 803, whether the collected information and the analyzed results satisfy the trigger issuing rule 202 or not is judged. When the rule is satisfied, the trigger is issued.

Further, the trigger issuing rule 202 is composed of the objects to be judged and the conditions of the established policy. When the policy is established, the objects to be judged and the conditions of the policy are transmitted from the management server 206 to the performance manager 201 to be stored as the trigger issuing rule 202.

Figure 9:
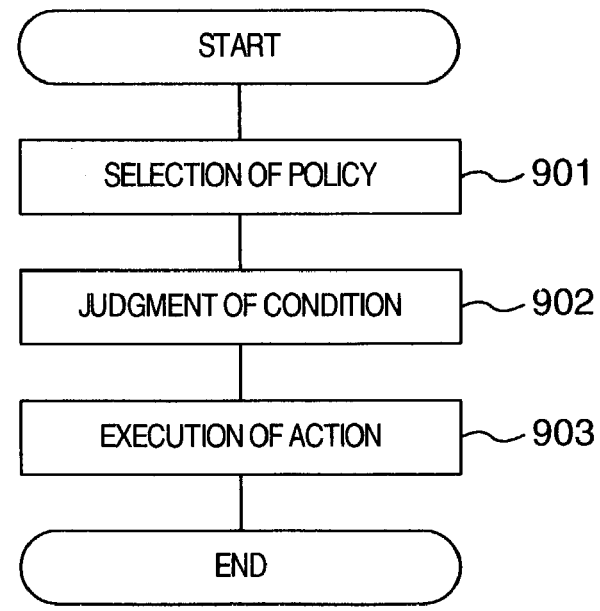
FIG. 9 is a flow chart showing processing example of a management server.

FIG. 9 shows an example of processing of the management server 205. The management server 205 selects the policy in step 901. The selection of the policy has been described with reference to FIG. 4 and the like. The trigger issuing rule corresponding to the selected policy is transmitted to the performance manager 201 to be stored as the trigger issuing rule 202. Thereafter, each time the trigger transmitted from the performance manager 201 is received, the processing in steps 902 and 903 is repeated. That is, in step 902, the condition of the policy relative to the received trigger is judged. When the condition is satisfied, the action corresponding to the condition is executed in step 903.

Further, the condition to be judged in step 902 is not only the condition relative to the trigger transmitted from the performance management manger 201. There is a case where the management server 205 makes judgment independently besides the judgment by the performance manager 201. For example, when the condition in a mere storage configuration which is not related to the prediction value relative to the storages is judged, the judgment can be made by only the management server 205. Further, a plurality of performance managers 201 may be provided in the system. For example, the storages may be classified into groups in accordance with any category and a plurality of performance manager may be provided as a performance manager given charge of a first group and a performance manager given charge of a second group and so on. In this case, when the policy includes a combination of AND and OR of triggers from the plurality of performance management mangers, whether the condition of the policy is effective or not is decided by the management server 205 (step 902).

FIGS. 10A and 10B show an example of a state transition diagram used in judgment of conditions. In FIG. 10A, states to which a state is to be moved next in response to each event occurring in each of states are described. For example, when an event (trigger) I1 occurs at a state S1, the state is moved to S2. When an event (trigger) I2 occurs at the state S2, an action Z1 is executed. In FIG. 10B, a command and a parameter of the action Z1 are described and the command to be issued for the action Z1 is understood. By using such a state transition diagram, some conditions can be combined to execute an action.

In the embodiment, the performance management server and the management server are constructed separately, although they may be constructed on the same computer.

As described above, according to the embodiment, since the situation information of the storage devices constituting the SAN (Storage Area Network) is collected to calculate the actual result value in the past, the current value or the prediction value in the future relative to the use capacity of the storages, the number of I/O operations of disk or the fragmentation and the predetermined action is executed when the condition of the policy established thereby is satisfied, flexible storage management can be made in conformity with the situations. Particularly, since management is made on the basis of the prediction value in the future, treatment can be made in accordance with the situations predicted after one month, for example.

As described above, according to the present invention, since the situation information of the storage devices is collected and it is instructed that processing is executed on the basis of the collected information and previously defined contents of processing and execution, the storage devices can be managed flexibly in accordance with the state.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A method for managing data processed in an information processing system having a management computer, a plurality of server computers and a plurality of storage systems coupled to the server computers via a network, the server computers sending data to at least one of the storage systems, the method comprising:

displaying, on the management computer, configuration information depicting the server computers, at least one switch in the network, the storage systems and the network coupling the server computers and the storage systems via the at least one switch;

defining, by input to the management computer, a data movement condition to trigger movement of data to be processed by at least one of the server computers and at least one of the storage systems in the configuration information displayed on the management computer, the data movement condition including that the data is stored for a certain period of time;

identifying data that satisfies the data movement condition;

moving the identified data that satisfies the data movement condition from a storage area to another storage area, the storage area and the another storage area relating to one or more disks in the storage systems in the configuration information displayed on the management computer;

defining, by input to the management computer, a data compression condition to trigger compression of data to be processed by at least one of the server computers and at least one of the storage systems in the configuration information displayed on the management computer, identifying data that satisfies the data compression condition; and compressing the identified data that satisfies the data compression condition.

2. A method according to claim 1, wherein the period of time is a period of time in which the data is monitored for identifying data that satisfies the data movement condition.

3. A method according to claim 1, wherein the data movement condition further includes an access frequency within said period of time.

4. A method according to claim 1, wherein the data movement condition includes a capacity of a storage area in a storage system at an end of the period of time, and wherein the method further comprises obtaining prediction capacity values for each of a plurality of storage areas each corresponding to one of the storage systems, such that the identifying step identifies a storage area satisfying the data movement condition based on the prediction capacity values, and the moving step moves data from the identified storage area to the another storage area.

5. A method for managing data processed in an information processing system having a management computer, a plurality of server computers and a plurality of storage systems coupled to the server computers via a network, the server computers sending data to at least one of the storage systems, the method comprising:

displaying, on the management computer, a configuration describing the server computers, at least one switch in the network and the storage systems;

being set, by input to the management computer, a data deletion condition to trigger deletion of data that is processed by at least one of the server computers and at least one of the storage systems in the configuration displayed on the management computer, the data deletion condition including that the data is stored for a certain period of time;

identifying data that satisfies the data deletion condition;

deleting the identified data that satisfies the data deletion condition from a storage area, which relates to at least one disk in the at least one of the storage systems and stores the identified data, being set, by input to the management computer, a data compression condition to trigger compression of data that is processed by at least one of the server computers and at least one of the storage systems in the configuration displayed on the management computer, identifying, data that satisfies the data compression condition; and compressing the identified data that satisfies the data compression condition.

6. A method for managing one or more files in an information processing system having a management computer, a plurality of server computers and a plurality of storage systems coupled to the server computers via a network, the server computers sending data to at least one of the storage systems, the method comprising:

displaying, on the management computer, a configuration depicting the server computers, at least one switch in the network, the storage systems and a plurality of paths being used to couple among the server computers, the at least one switch and the storage systems;

being inputted, on the management computer, a file deletion condition to trigger deletion of a file from at least one of the storage systems in the configuration displayed on the management computer, the file deletion condition including that the file is stored for a certain period of time;

identifying at least one file that satisfies the file deletion condition;

deleting the data corresponding to the identified file from the at least one of the storage systems in the configuration displayed on the management computer;

being inputted, on the management computer, a file compression condition to trigger compression of a file to be processed by at least one of the server computers and at least one of the storage systems in the configuration displayed on the management computer, identifying at least one file that satisfies the file compression condition; and compressing data corresponding to the identified file that satisfies the data compression condition.

7. A method according to claim 6, wherein the file deletion condition includes a rate of a use capacity of a storage area in one of the storage systems, such that the identifying step of the file deletion condition identifies the at least one file stored in a storage area that exceeds the rate of a use capacity, and the deleting step deletes the data corresponding to the identified file from the storage area.

8. An information processing system, comprising:

a plurality of storage systems coupled to a network and having a plurality of storage areas related to one or more disks, a plurality of server computers coupled to the storage systems via the network and sending data to at least one of the storage systems via the network, and a management computer coupled to the server computers and the storage systems, wherein the management computer displays configuration information depicting the server computers, at least one switch in the network and the storage systems;

wherein, if the management computer receives a data movement condition to trigger movement of data to be processed by at least one of the server computers and at least one of the storage systems in the configuration information displayed on the management computer, the management computer stores the data movement condition, the data movement condition including that the data is stored for a certain period of time;

wherein the storage systems move an identified data that satisfies the data movement condition from one of the storage areas to another one of the storage areas after spending the certain period of time, wherein, if the management computer receives a data compression condition to trigger compression of data to be processed by at least one of the server computers and at least one of the storage systems in the configuration information displayed on the management computer, the management computer stores the data compression condition;

wherein at least one of the server computers and the storage systems compresses an identified data that satisfies the data compression condition.

9. An information processing system according to claim 8, wherein the period of time is a period of time in which the data is monitored for identification of data that satisfies the data movement condition.

10. An information processing system according to claim 8, wherein the data movement condition includes an access frequency within the period of time.

11. An information processing system according to claim 8, wherein the data movement condition includes a capacity of a storage area of one of the storage systems at an end of the period of time, wherein the computer obtains prediction capacity values for each of a plurality of storage areas of the storage systems, and wherein at least either the computer or at least one of the server computers identifies at least one storage area of one of the storage systems satisfying the data movement condition based on the prediction capacity values, and moves data from the identified storage area to another storage area.

12. An information processing system according to claim 8, wherein at least either the computer or at least one of the server computers has a plurality of programs and a memory which stores link information of each of the programs, and at least either the computer or at least one of the server computers identifies necessary programs to issue a command based on the link information, the command targeted to at least one of the storage systems based on the identification of data that satisfies the data movement condition.

13. An information processing system, comprising:
a plurality of storage systems coupled to a network and having a plurality of storage areas related to a plurality of disks,
a plurality of server computers coupled to the storage systems via the network and sending data to at least one of the storage systems via the network, and
a management computer coupled to the server computers and the storage systems,
wherein the management computer displays configuration information describing the server computers, at least one switch in the network, the storage systems and a plurality of paths being used to couple among the server computers, the at least one switch and the storage systems,
wherein the management computer is inputted with a data deletion condition to trigger deletion of data processed by at least one of the server computers and at least one of the storage systems in the configuration information displayed on the management computer;
wherein the storage systems delete an identified data that satisfies the data deletion condition based on identifying data that satisfies the data deletion condition;
wherein the management computer is inputted with a data compression condition to trigger compression of data processed by at least one of the server computers and at least one of the storage systems in the configuration information displayed on the management computer, and
wherein at least one of the server computers and the storage systems compresses an identified data that satisfies the data compression condition based on identifying data that satisfies the data compression condition.

14. An information processing system for managing one or more files, comprising:
a plurality of storage systems coupled to a network and having a plurality of storage areas related to a plurality of disks,
a plurality of server computers coupled to the storage systems via the network and sending data to at least one of the storage systems via the network, and
a management computer coupled to the server computers and the storage systems,
wherein the management computer displays a configuration depicting the server computers, at least one switch in the network and the storage systems;
wherein the management computer is set with a file deletion condition to trigger deletion of at least one file to be processed by at least one of the server computers and at least one of the storage systems in the configuration displayed on the management computer, the file deletion condition including that the at least one file is stored for a certain period of time;
wherein the storage systems delete the data of one or more identified files from the one or more of the storage systems after the certain period of time, the one or more identified files satisfying the file deletion condition;
wherein of the management computer is set with a file compression condition to trigger file compression; and
wherein at least one of the server computers and the storage systems compresses data of one or more identified files that satisfy the file compression condition.

15. An information processing system according to claim 14, wherein the file deletion condition includes a rate of a use capacity of a storage system, such that at least either the management computer or at least one of the server computers identifies the one or more files corresponding to data stored in at least one storage system that exceeds the rate of a use capacity.

16. A method according to claim 1, wherein the data movement condition is defined for data of a certain file that satisfies another condition.

17. A method according to claim 1, wherein the data movement condition is defined for data of a plurality of certain files that satisfy another condition.

18. A method according to claim 5, wherein the data deletion condition is set for data of a certain file that satisfies another condition.

19. A method according to claim 5, wherein the data deletion condition is set for data of a plurality of certain files that satisfy another condition.

20. A method according to claim 6, wherein the file deletion condition is inputted for a certain file that satisfies another condition.

21. A method according to claim 6, wherein the file deletion condition is inputted for a plurality of certain files that satisfy another condition.

22. An information processing system according to claim 8, wherein the data movement condition is defined for data of a certain file that satisfies another condition.

23. An information processing system according to claim 8, wherein the data movement condition is defined for data of a plurality of certain files that satisfy another condition.

24. An information processing system according to claim 13, wherein the data deletion condition is inputted for data of a certain file that satisfies another condition.

25. An information processing system according to claim 13, wherein the data deletion condition is inputted for data of a plurality of certain files that satisfy another condition.

26. An information processing system according to claim 14, wherein the file deletion condition is set for a certain file that satisfies another condition.

27. An information processing system according to claim 14, wherein the file deletion condition is set for a plurality of certain files that satisfy another condition.

28. A method for managing data processed in an information processing system having a management computer, a plurality of server computers and a plurality of storages coupled to the server computers via a network, the server computers sending data to at least one of the storages the method comprising:
displaying, on the management computer, configuration information describing the server computers, at least one switch in the network and the storages;
being set, by input to the management computer, a data movement condition to trigger movement of data to be processed by at least one of the server computers and at least one of the storages in the configuration information displayed on the management computer, the data movement condition including that the data is stored for a period of time in which the data is monitored;
moving an identified data that satisfies the data movement condition between a plurality of storage areas related to a plurality of disks in the storages after the period of time, being set, by input to the management computer, data compression condition to trigger compression of data to be processed by at least one of the server computers and at least one of the storages in the configuration information displayed on the management computer; and compressing an identified data that satisfies the data compression condition.

29. A method according to claim 28, wherein the data movement condition is set for data of a certain file that satisfies another condition.

30. A method according to claim 28, wherein the data movement condition is set for data of a plurality of certain files that satisfy another condition.

31. A method for managing data processed in an information processing system having a management computer, a plurality of server computers and a plurality of storage systems coupled to the server computers via a network, the server computers sending data to at least one of the storage systems, the method comprising:

displaying, on the management computer, configuration information depicting the server computers, at least one switch in the network, the storage systems and a plurality of paths being used to couple among the server computers, the at least one switch in the network and the storage systems;

being inputted, by input to the management computer, a data movement condition to trigger movement of data to be processed by at least one of the server computers and at least one of the storage systems in the configuration information displayed on the management computer;

identifying data that satisfies the data movement condition;

moving the identified data from a storage area to another storage area, the storage area and the another storage area relating to one or more disks in the storage systems in the configuration information displayed on the management computer;

being inputted, by the management computer, a data compression condition to trigger compression of data to be processed by at least one of the server computers and at least one of the storage systems in the configuration information displayed on the management computer;

identifying, data that satisfies the data compression condition; and compressing the identified data that satisfies the data compression condition.

32. A method according to claim 31, further comprising:

being inputted, by using the management computer, a data deletion condition to trigger deletion of data to be processed by at least one of the server computers and at least one of the storage systems in the configuration information displayed on the management computer;

identifying data that satisfies the data deletion condition; and deleting the identified data that satisfies the data deletion condition.

33. A method according to claim 31, wherein:
the data movement condition includes that the data is stored for a certain period of time.

34. A method according to claim 31, further comprising:
being inputted, by the management computer, a data deletion condition to trigger deletion of data to be processed by at least one of the server computers and at least one of the storage systems in the configuration information displayed on the management computer;

wherein the data deletion condition includes that the data is stored for a certain period of time.

35. A method according to claim 31, wherein:
the data compression condition includes that the data is stored for a certain period of time.

36. A method for managing one or more files processed in an information processing system having a management computer, a plurality of server computers and a plurality of storage systems coupled to the server computers via a network, the server computers sending data to at least one of the storage systems, the method comprising:

displaying, on the management computer, a configuration describing the server computers, at least one switch in the network and the storage systems;

being inputted, by input to the management computer, a file deletion condition to trigger deletion of at least one file to be processed by at least one of the server computers and at least one of the storage systems in the configuration displayed on the management computer;

identifying one or more files that satisfy the file deletion condition;

deleting data corresponding to the identified files that satisfy the file deletion condition from the one or more of the storage systems;

being inputted, by input to the management computer, a file compression condition to trigger compression of at least one file to be processed by at least one of the server computers and at least one of the storage systems in the configuration displayed on the management computer, identifying one or more files that satisfy the file compression condition; and compressing data corresponding to the identified files that satisfy the file compression condition.

37. A method according to claim 1, further comprising:
issuing a command targeted to at least one of the storage systems based on the identifying step for identifying data that satisfies the data movement condition;

wherein the moving step is processed in response to the command.

38. A method according to claim 1, wherein the network is a Storage Area Network (SAN).

39. A method according to claim 5, further comprising:
issuing a command targeted to at least one of the storage systems based on the identifying step for identifying data that satisfies the data deletion condition;

wherein the deleting step is processed in response to the command.

40. A method according to claim 5, wherein the network is a Storage Area Network (SAN).

41. A method according to claim 6, further comprising:
issuing a command targeted to at least one of the storage systems based on the identifying step identifying at least one file that satisfies the file deletion condition;

wherein the deleting step is processed in response to the command.

42. A method according to claim 6, wherein the network is a Storage Area Network (SAN).

43. An information processing system according to claim 8, wherein at least either the management computer or at least one of the server computers identifies data that satisfies the data movement condition; and issues a command targeted to at least one of the storage systems based on the identification of data that satisfies the data movement condition; and wherein the at least one of the storage systems moves the identified data that satisfies the data movement condition in response to the command.

44. A method according to claim 8, wherein the network is a Storage Area Network (SAN).

45. An information processing system according to claim 13, wherein at least either the management computer or at least one of the server computers identifies data that satisfies the data deletion condition; and issues a command targeted to at least one of the storage systems based on the identification of data that satisfies the data deletion condition; and wherein the at least one of the storage systems deletes the identified data that satisfies the data deletion condition in response to the command.

46. A method according to claim 13, wherein the network is a Storage Area Network (SAN).

47. An information processing system according to claim 14, wherein at least either the management computer or at least one of the server computers identifies one or more files that satisfies the file deletion condition; and issues a command targeted to at least one of the storage systems based on the identification of the one or more files that satisfies the file deletion condition; and wherein the at least one of the storage systems deletes the one or more identified files that satisfies the file deletion condition in response to the command.

48. A method according to claim 14, wherein the network is a Storage Area Network (SAN).

49. A method according to claim 28, further comprising:

identifying data that satisfies the data movement condition, and issuing a command targeted to at least one of the storages based on the identification of the data that satisfies the file deletion condition;

wherein the moving step is processed in response to the command.

50. A method according to claim 28, wherein the network is a Storage Area Network (SAN).

51. A method according to claim 31, further comprising:

issuing a command targeted to at least one of the storage systems based on the identifying step;

wherein the moving step is processed in response to the command.

52. A method according to claim 31, wherein the network is a Storage Area Network (SAN).

53. A method according to claim 36, further comprising:

issuing a command, targeted to at least one of the storage systems based on the identifying step;

wherein the deleting step is processed in response to the command.

54. A method according to claim 36, wherein the network is a Storage Area Network (SAN).

* * * * *